(12) United States Patent
Hoth

(10) Patent No.: US 6,233,583 B1
(45) Date of Patent: May 15, 2001

(54) REPORT GENERATOR FOR USE WITHIN A LOTUS NOTES DATABASE SYSTEM

(75) Inventor: Robert Aloise Hoth, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/151,088

(22) Filed: Sep. 10, 1998

(51) Int. Cl.[7] .................................................... G06F 17/30
(52) U.S. Cl. ................... 707/102; 707/2; 707/3; 707/4; 707/7; 707/201
(58) Field of Search ............................ 707/2, 3, 4, 207, 707/102, 7

(56) References Cited

U.S. PATENT DOCUMENTS

| | | | |
|---|---|---|---|
| 5,832,208 | * | 11/1998 | Chen et al. .......................... 713/201 |
| 5,966,707 | * | 10/1999 | Van Huben et al. .................. 707/10 |
| 6,064,977 | * | 5/2000 | Haverstock et al. ..................... 705/9 |
| 6,070,190 | * | 5/2000 | Reps et al. ........................... 709/224 |
| 6,094,655 | * | 7/2000 | Roger et al. ............................ 707/10 |

OTHER PUBLICATIONS

Vandenbosch et al. "Lotus Notes and Collaboration: le plus ca change", IEEE, pp. 61–71, Jan. 1996.*
Paul Cummings, "Enhancing Lotus Notes for carrier Grade hosting", IEEE, pp. 488–407, Jan. 1996.*
Russ Kiger, "Expert system & Lotus Notes applications for retrieval of problem–solving knowledge & information", IEEE, pp. 344–350, May 1996.*
Berthold Reinwald , C. Mohan, "Structured workflow management with lotus Notes Release 4", IEEE, pp. 451–457, Jan. 1996.*
Stephan Schoening, "Supporting a software engineering course with lotus notes", IEEE, pp. 304–311, Sep. 1998.*
Bucky Pope, "Characterizing Lotus Notes Email Clients", IEEE, pp. 128–132, 03/98.*
Schultze et al., "Hard and Soft information Genres: An Analysis of two Notes Databases", pp. 40–49, 1/97.*
James E. Powell; "Mastering Approach 3 for Windows"; Chapter 11, Reports, pp. 370–404; Chapter 12, Finding and Sorting Data, pp. 411 –437, 1995.

(List continued on next page.)

Primary Examiner—Hosain T. Alam
Assistant Examiner—Jean M. Corrielus
(74) Attorney, Agent, or Firm—Dugan & Dugan

(57) ABSTRACT

A computer program product is provided that facilitates report generation within a Lotus Notes database system by providing a user interface which allows a general user with no knowledge of the database system and with no knowledge of Lotus Notes query syntax or Script Code to generate customized reports. The program product includes an Initialization Table and a Report Template on which an administrative user enters information (e.g., database name, database location, searchable field information, information to be retrieved and information to be displayed) specific to the database system to be searched. Thereafter, based on the user provided information within the Initialization Table and the Report Template a user interface displays a number of search options (e.g., databases to search, searchable field information and Report Templates from which to select). A general user selects among the displayed options and the program product generates a query string, searches the selected databases based on the query string, and organizes and displays the collected information. The Initialization Table and the Report Templates can be altered to reflect changes in the database system, and the program product dynamically incorporates the changes; no new Lotus Notes Script Code need be written to accommodate changes in the database system.

42 Claims, 10 Drawing Sheets

OTHER PUBLICATIONS

"IBM Visual Warehouse User's Guide Release 2", Contents pp. iii–xii, Chapter 1—Introducing the IBM Visual Warehouse, pp. 2–20, Chapter 8—Using the Business View icon, pp. 179–255 and pp. 262–264, 1995.

"Lotus Notes Release 4 The Power of People Working Together" Application Developer's Guide, Contents pp. iii and x–xiv, Chapter 1 Introduction to Notes Development, pp. 1–3, Chapter 5 Designing Views and Folders, pp. 207–303, 1995.

* cited by examiner

REPORT DEFINITION FORM

Source Databases:     X    first database 127a  
                                X    second database 127b   }403

Report Criteria:

407a → Department:

X    Video  
         _    Keyboard   }409a  
         _    Motherboard

407b  
Vendor:                      Product: 407c            409c

X    Monitor World          X    Computer Monitor  
_    Monitor Country       _    Laptop Monitor  
_    Monitor City           X    Screen Saver  
409b

Report Format

Report Template:    Dept/Vend/Product }413

Begin Date:    Jan 1998     End Date:    Feb 1998 }415

FIG. 4

REPORT TEMPLATE

Name: Dept/Vend/Product
Description: Lists for selected department sales of selected products Categories 1: [dept] [manager]
2: [vendor]
3: [product]
4:

Computable

| Label | Jan | Feb |
Year: [vendor] [product] <jan> <feb>

FIG. 5

REPORT DOCUMENT

General Information

ABC Company
Dept/Vend/Product (Jan/98 to Feb/98)
Owner:   John Doe
Description:   Number of products sold to a vendor Report Information Report Summary:   3 out of 3 (100%) document(s)
Report Criteria:   (Field dept = "Video")  AND (Field vendor = "Monitor World") AND
(Field product = "Computer Monitor" OR Field product = "Screen Saver")

|  |  | 1998 | 1998 |  |
| --- | --- | --- | --- | --- |
|  |  | Jan | Feb |  |
| Video | Doe J | 14 | 17 | ← 609a |
|  | Monitor World | 14 | 17 | ← 609b |
|  | Computer Monitor | 11 | 13 | ← 609c |
|  | Screen Saver | 3 | 4 | ← 609d |

FIG. 6

REPORT GENERATOR FOR USE WITHIN A LOTUS NOTES DATABASE SYSTEM

FIELD OF THE INVENTION

The present invention relates generally to a report generation program for generating reports within a homogeneous or heterogeneous database system, and more particularly to a report generation program for generating reports within Lotus Notes.

BACKGROUND OF THE INVENTION

Modern data processing environments often distribute a user's data among a plurality of databases each having a unique data format and unique data manipulation procedures. Such database systems are referred to as "heterogeneous database systems" and include systems such as Lotus Notes produced by Lotus Incorporated.

A particular disadvantage of storing data within Lotus Notes is the time, skill and cost associated with generating reports based on the stored data. Specifically, to generate reports within Lotus Notes a user must learn the database structure (e.g., field names, organization, acronym meanings, etc.) of each database containing relevant data, the location of each database (e.g., which server stores the database and the connection path thereto), the query syntax of Lotus Notes, as well as how to program Lotus Notes to collect, sort and display data. Additionally, each user within the database system must be notified each time the structure of a given database is changed (e.g., when a field is added to or removed from the database), and each time a database is added or deleted from the system. When such a change occurs each user must adjust his or her query syntax accordingly, and must revise the program used to sort and display the data.

Alternatively, reports can be generated from Lotus Notes databases using a second database program (such as data warehousing or data mining products that have reporting features). However, additional costs are incurred to purchase the additional database software, and to train users in its operation. Use of a second database program requires data stored in the Lotus Notes databases to be copied to a second database (associated with the second database program); the use of a second database program therefore requires added administrative effort as the structure of the second database must be revised each time the structure of a corresponding Lotus Notes database is revised. Therefore additional operating time is required for both initial data migration and for data refresh steps that ensure data contained in the second database is updated as new data is stored in the Lotus Notes database. Moreover, to see the data being reported on, a user must transfer from the second database program to Lotus Notes, making report generation with the second database program awkward and inconvenient.

Accordingly, there is a need for simplified report generation within Lotus Notes.

SUMMARY OF THE INVENTION

The present invention, provides for simplified report generation within a Lotus Notes database system. The inventive report generator provides two user paths, a general user path and an administrative user path. As described below, a general user need not learn the specific content, structure or location of any database within the system, and neither a general user nor an administrative user need learn Lotus Notes query syntax or programming methods.

In operation, before report generation can begin, an administrative user enters initial information regarding his or her specific database environment in an initialization file within the inventive report generator. The initial information includes the name of each database within the user's database system, the location (server and path) of each database, the number of, and a list of the fields to be read from each database during database searching (i.e., the retrieved field list), and the field categories and the fields within each category (i.e., the field category options) the administrative user designates as searchable and is preferably saved in a table (i.e., an Initialization Table). Typically this initial information is entered once and only is altered if the database environment changes.

Preferably the administrative user also enters initial information in the initialization file regarding report format. Specifically, the inventive report generator preferably provides a blank Report Template in which the administrative user enters field names in the order the administrative user wishes the field names to be displayed in a report, and then saves the Report Template with an identifiable name. A plurality of saved Report Templates, containing varying field names in varying orders, provides a user a plurality of report formats from which to choose. Thus, the administrative user fills out the blank Report Template and saves the Report Template as many times as desired to provide a plurality of report format options. After the user-specific initial information is provided in the Initialization Table and in the saved Report Templates, the report generator is ready to generate reports for a general user. Specifically, the report generator displays a form from which a general user can select databases and fields to search, and can select a report format for the information collected during the search. Thus, as used herein, user-selected, user-selectable and the like describe selection which does not require the user to manually generate program code. Likewise, user-provided or user-specified information is information provided or specified without requiring the user to manually generate program code.

As is apparent from the above description, the inventive report generator allows a general user to generate reports within either a heterogeneous or a homogenous Lotus Notes database system, without requiring a general user to know the content, structure or location of the various databases in the system. Moreover, a user, whether general or administrative, generates reports within Lotus Notes without writing any Lotus Notes programming code, and searches Lotus Notes databases without manually generating a single query string. The report generator locates the databases, generates the query strings, searches the databases, retrieves the desired information and organizes and displays the information, allowing for customized report generation with merely a few clicks of a mouse.

The structure and content of the initialization file, allows the report generator to adapt easily to any database environment. The Initialization Table and the Report Template Forms may be updated at any time and the report generator adapts dynamically. Further, the inventive report generator realizes quick report generation times as data is stored and manipulated within Lotus Notes and no data migration occurs.

Other objects, features and advantages of the present invention will become more fully apparent from the following detailed description of the preferred embodiments, the appended claims and the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

FIG. 4 is a representative Report Definition Form generated by the Report Engine of FIG. 2;

FIG. 5 is a representative Report Template for use with the Report Engine of FIG. 2; and FIG. 6 is a representative Report Document generated by the Report Engine of FIG. 2.

DETAILED DESCRIPTION OF THE PREFERRED EMBODIMENTS

Figure 1:
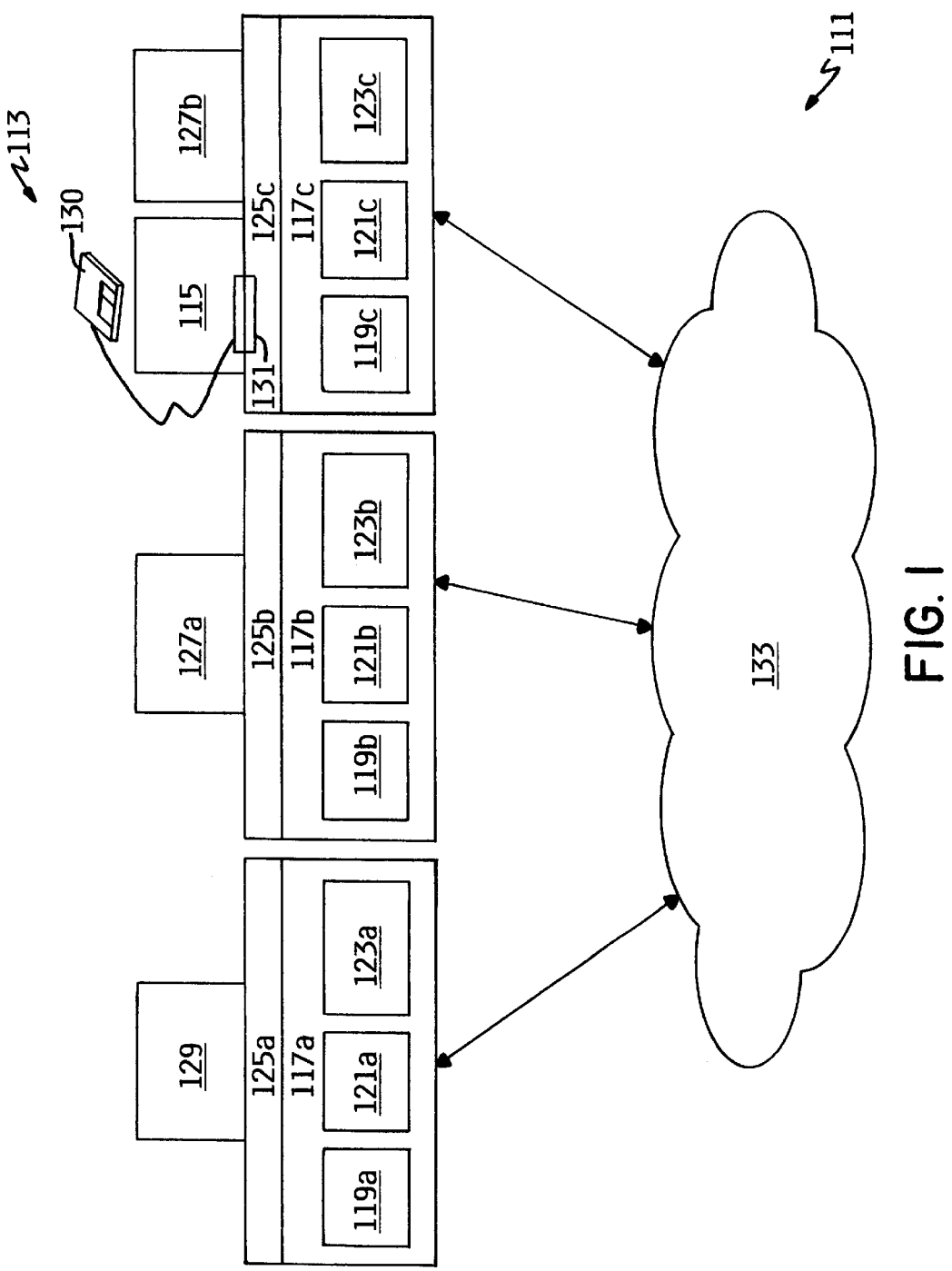
FIG. 1 is a block diagram illustrating a computer network which stores and runs a Lotus Notes database system with an inventive Report Engine operatively coupled therein.

It will be understood with reference to the following description of the Report Engine's operation, that Lotus Notes Script Code within the Report Engine controls the operations described. Accordingly, armed with the following description, a Lotus Notes programmer of ordinary skill will be able to provide Lotus Notes Script Code for performing the operations described herein.

To generate a report, a user executes the inventive report generator, hereinafter the "Report Engine", (e.g., by double clicking a Report Engine Icon within Lotus Notes), and a Report Definition Form (described below) is displayed on the user's computer screen. Preferably the user may open a new Report Definition Form or a previously saved Report Definition Form (containing previously selected databases, field category options and report formatting options as described below). The Report Definition Form displayed by the Report Engine contains the user-provided database names (previously provided in the Initialization Table by the administrative user) and a user selects one or more databases to search. The Report Definition Form also contains the searchable field categories and searchable field category options (provided in the Initialization Table), and the user then selects the field category options to search for within each selected database. Also displayed on the Report Definition Form are the names of the Report Templates previously saved by the administrative user. The user selects one of the displayed Report Template names, thereby determining the display format for the report.

The Report Engine generates a Lotus Notes query string based on the user-selected field category options, and instructs Lotus Notes to execute a full text search against each selected database using the query string and the database location information provided in the Initialization Table. Lotus Notes identifies the desired documents (e.g., those which contain the user-selected field category options) within each user-selected database. Instead of retrieving the entire contents of each identified document, for each identified document the Report Engine stores (within a random-access file) only the field information for each field listed in the Initialization Table's retrieved field list. Thus, for each identified document, the random-access file contains only a "retrieved information list" rather than the entire identified document.

Thereafter, the Report Engine organizes the retrieved information lists (corresponding to the identified documents). Specifically, because each identified document's retrieved information list may comprise many fields, the Report Engine assigns each retrieved information list an identifying key (comprising a concatenated list of field category values for the field categories employed within the selected Report Template). The Report Engine then assigns each key a pointer which points to the retrieved information list identified by the key, and the Report Engine sorts the keys (e.g., alphabetically, or as otherwise specified). The information to be displayed (previously provided in the saved Report Template by the administrative user) is obtained from among the retrieved information lists (retrieved from the documents identified during the full text search), and is displayed as a report in the order of the sorted keys and in the overall layout of the selected Report Template. The use of keys allows the Report Engine to quickly and easily organize the information collected from the identified documents. That is, the keys allow the Report Engine to quickly and easily organize the retrieved information lists without sorting or reordering the retrieved information lists themselves (which may contain hundreds of fields).

FIG. 1 is a block diagram illustrating a computer network 111 which stores and runs a Lotus Notes database system 113 with an inventive Report Engine 115 operatively coupled therein. The computer network 111 includes a plurality of computers 117a–c, each computer 117a–c respectively containing various hardware components such as a central processing unit (CPU) 119a–c, a random access memory (RAM) 121a–c and an input/output (I/O) interface 123a–c. Each computer 117a–c includes an operating system 125a–c, suitable for executing a Lotus Notes application. Such operating systems are well known and include OS/2, DOS, DOS/Windows, etc.

The database system 113 includes a first Lotus Notes database 127a, a second Lotus Notes database 127b, and a Lotus Notes application 129 running on the first computer 117a. The Lotus Notes application 129 may be stored on the hard drive (not shown) of the first computer 117a or on a floppy disc, compact disc or similar storage medium. For convenience, the Lotus Notes application 129 is illustrated as being physically connected to the first computer 117a.

A communication network 133, such as a local area network (LAN) or a wide area network (WAN), operatively couples each of the computers 117a–c, such that the computers 117a–c can communicate with each other over the communication network 133. The communication network 133 therefore operatively couples the inventive Report Engine 115 to the Lotus Notes databases 127a–b and to the Lotus Notes application 129. The Lotus Notes databases 127a–b and the inventive Report Engine 115 can be located on any computer (having an operating system suitable for Lotus Notes execution) coupled to the communication network 133; the computer network 111 and the database system 113 of FIG. 1 merely exemplify one possible configuration.

The Report Engine 115 is a computer program product comprising a computer readable media or carrier 130 having computer program logic recorded thereon. The Report Engine 115 is read by a storage device such as a floppy drive unit, a hard drive unit, a tape backup unit, etc., represented generally by the reference numeral 131. The storage device 131 may store the Report Engine 115, or alternatively, the computer program logic within the Report Engine 115 may be loaded from the carrier to another storage location via the storage device 131. Thereafter, the CPU 119a of the first computer 117a can execute the Report Engine 115's computer program logic, enabling the first computer 117a, in conjunction with the Lotus Notes application 129, to generate reports within the database system 113 as described with reference to FIG. 2.

Figure 2:
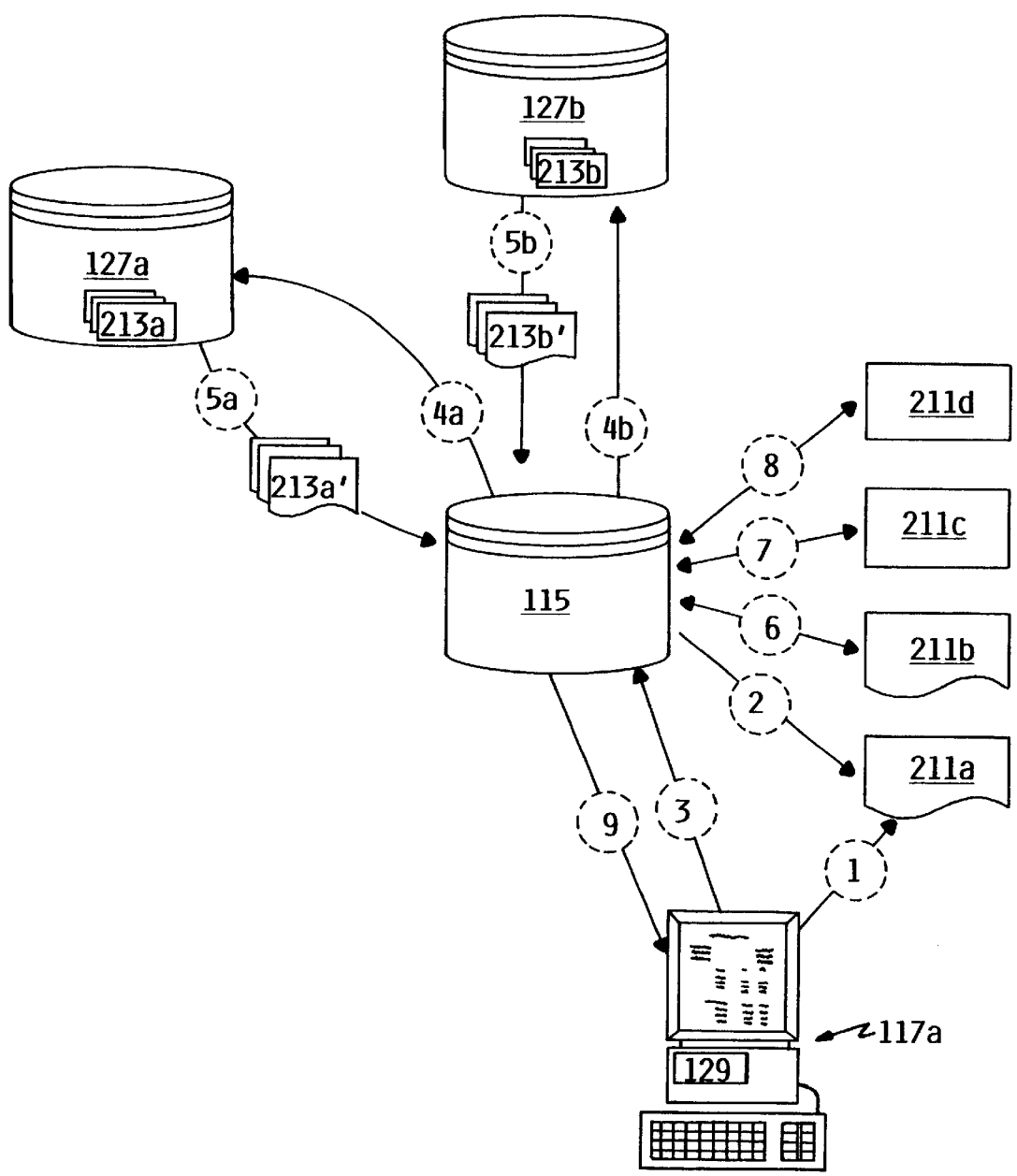
FIG. 2 is a schematic diagram illustrating the Report Engine and the flow of commands and information among the Lotus Notes source databases and the Report Engine.
Figure 3A:
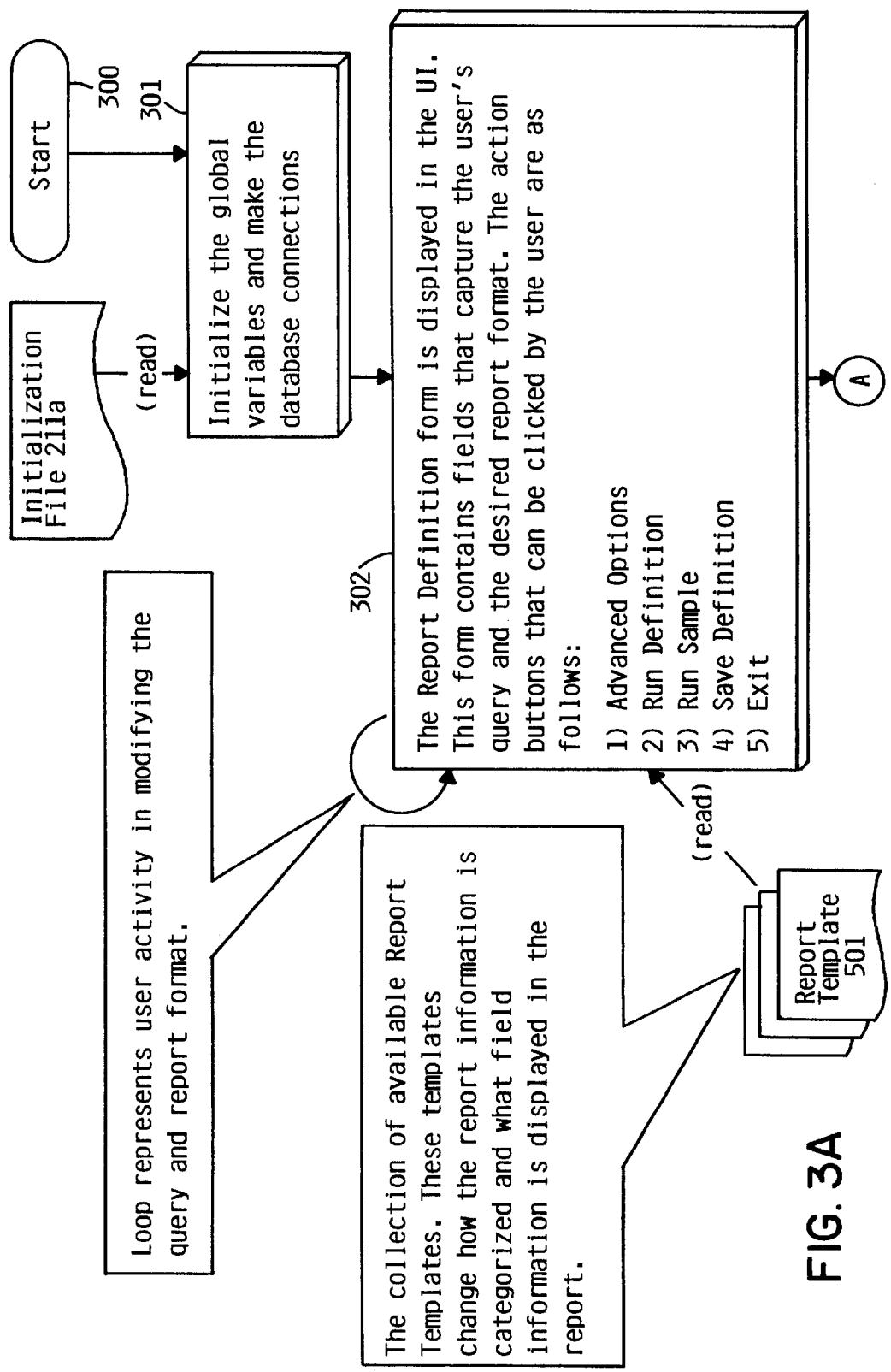
FIGS. 3A–E are an operational flow diagram for the Report Engine of FIG. 2.
Figure 3B:
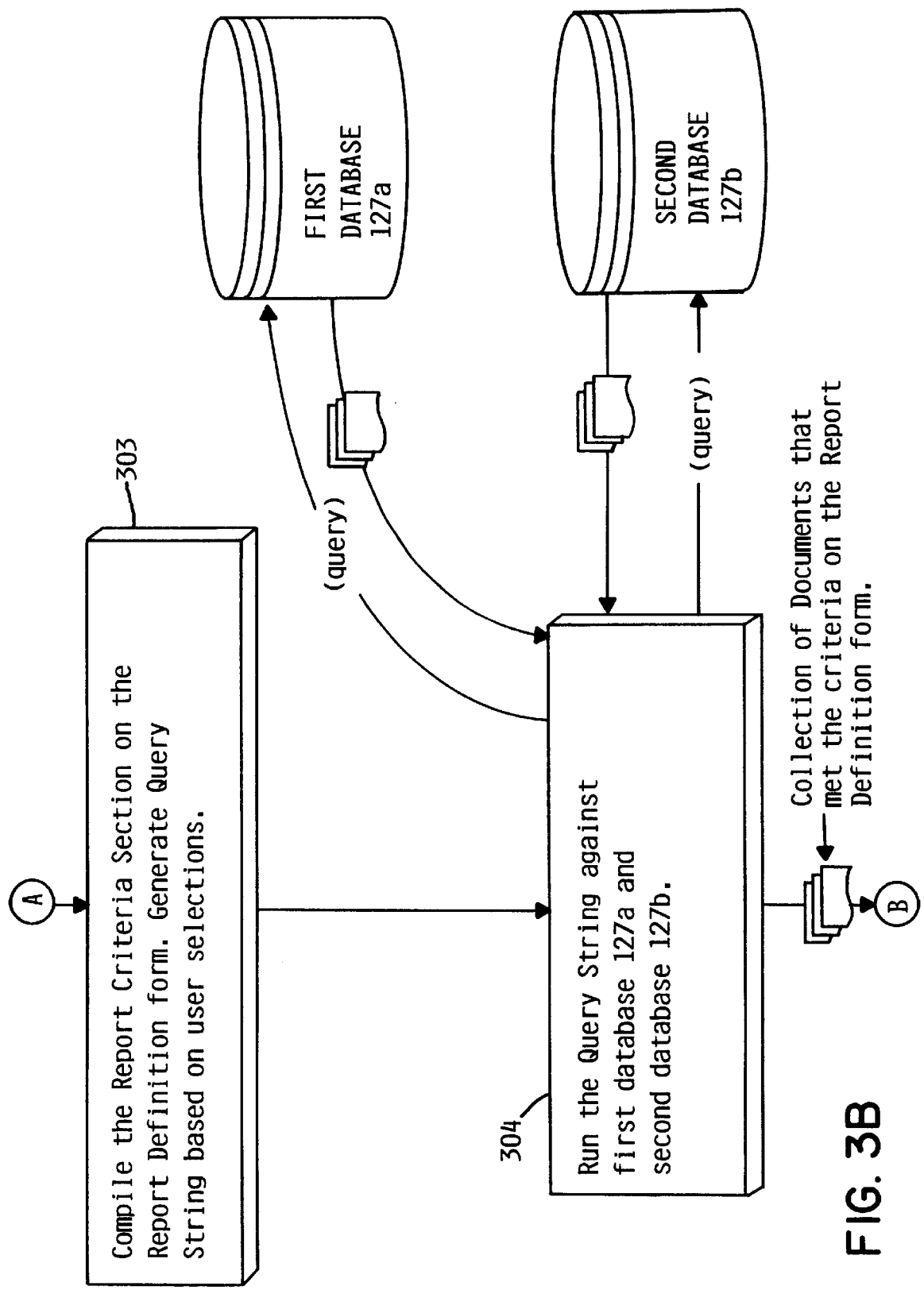
Figure 3C:
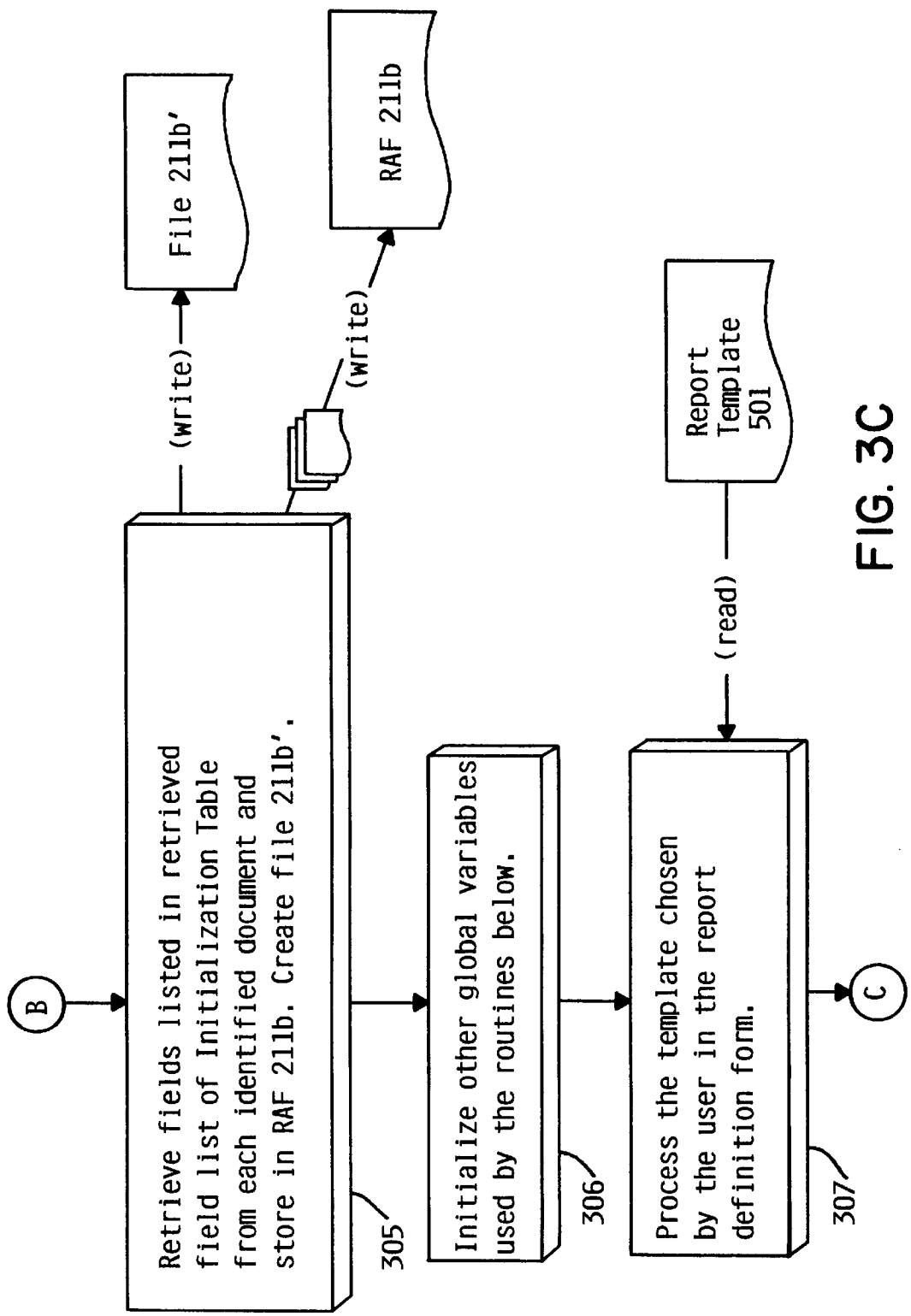
Figure 3D:
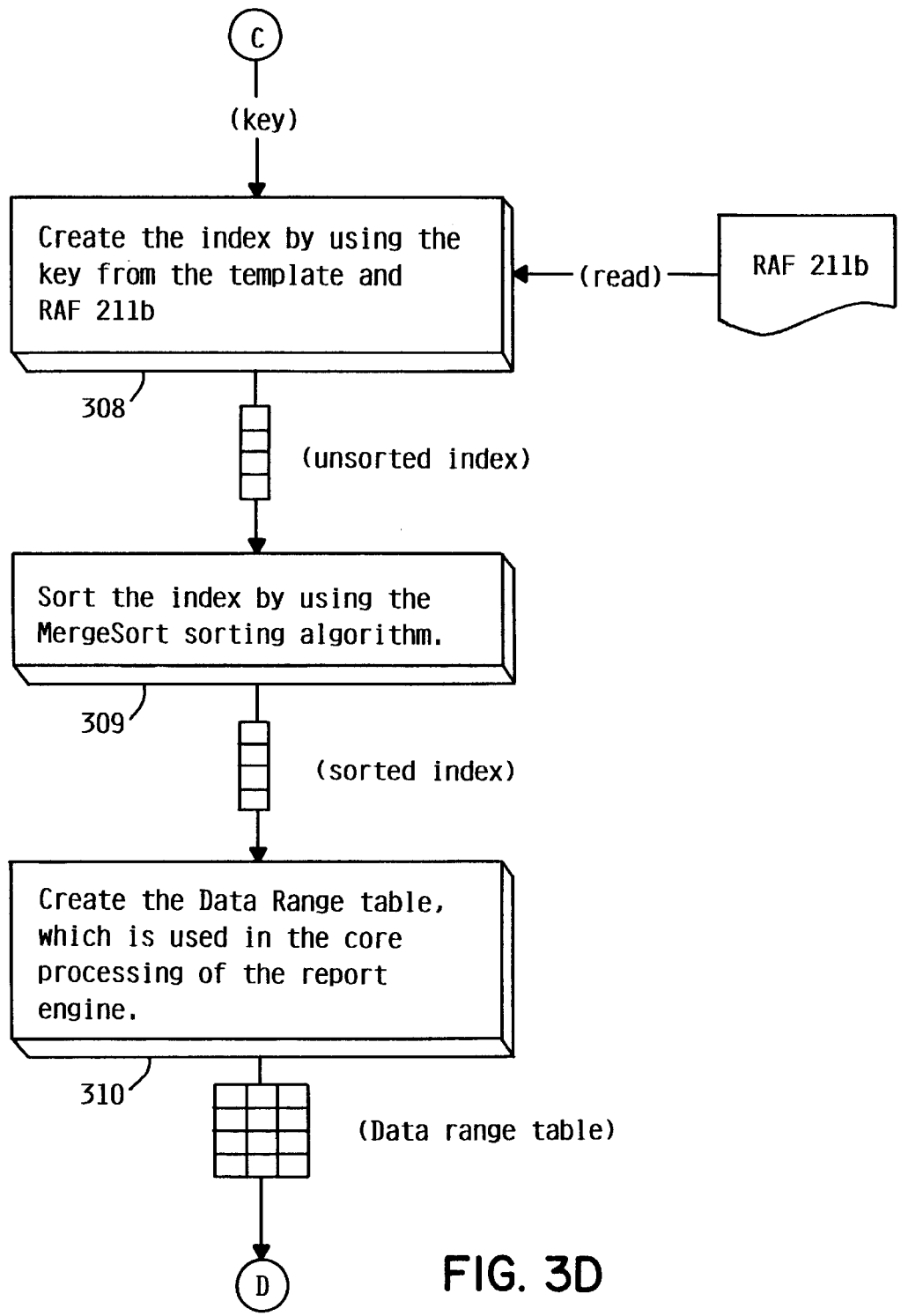
Figure 3E:
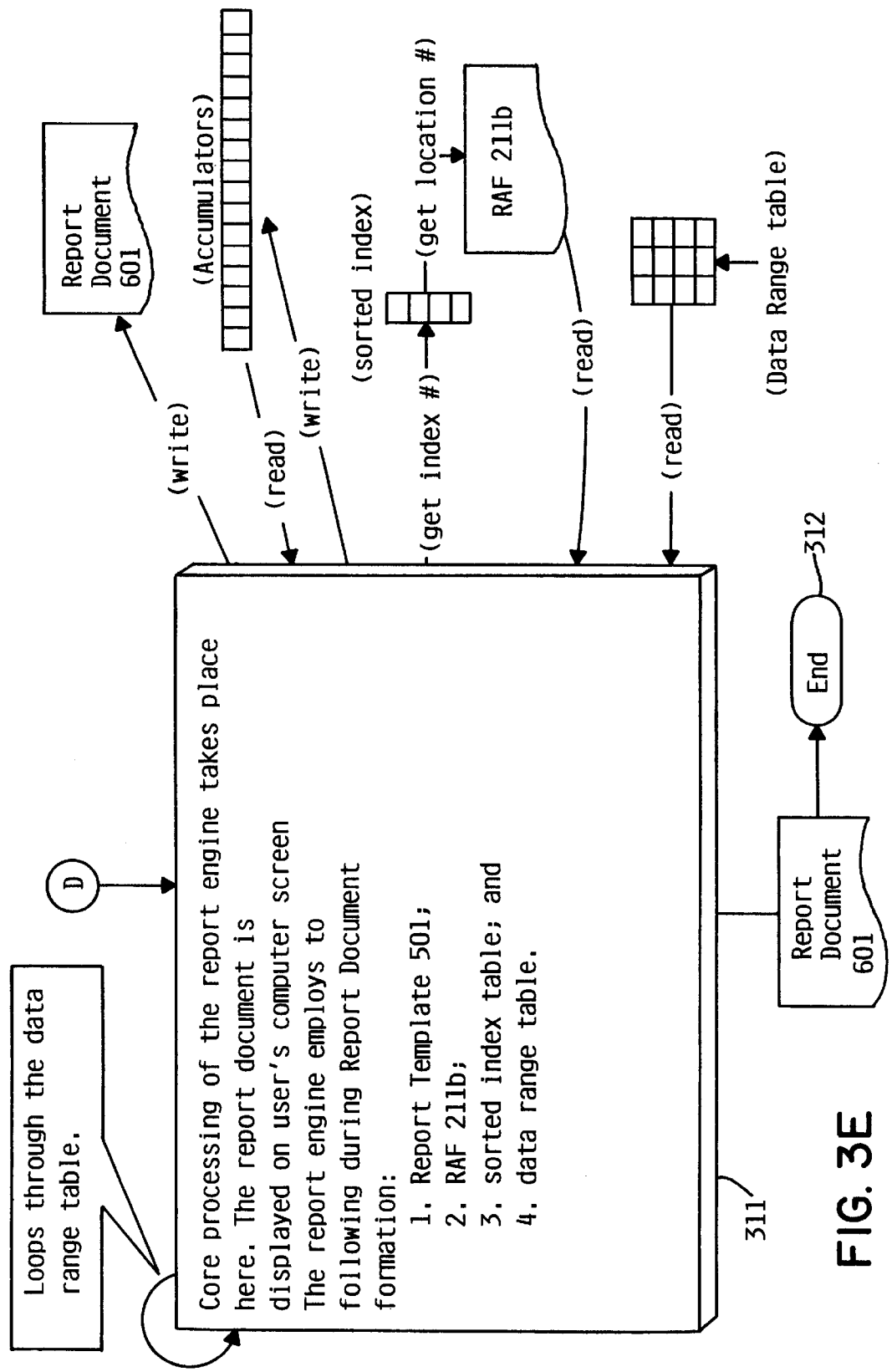

FIG. 2 is a schematic diagram illustrating the Report Engine 115 and the flow of commands and information among the Lotus Notes source databases 127a–b and the inventive Report Engine 115. Referring to FIG. 2, the Report Engine 115 comprises a Lotus Notes database containing Lotus Notes Script Code and a plurality of files 211a–b and a plurality of arrays 211c–d. As used herein, a file may comprise a conventional file (such as a random access file) or a Lotus Notes document. The files 211a–b and the arrays 211c–d are illustrated adjacent the Report Engine 115 so that data transfer to/from the files 211a–b and the arrays 211c–d may be clearly represented. The remaining components of FIG. 2 are described with reference to the general operation of the inventive Report Engine 115.

In operation the Report Engine 115 is loaded into the storage device 131 of the third computer 117c, and is executed by the Lotus Notes application 129 running on the first computer 117a. Computer program logic within the Report Engine 115 causes one or more icons to be displayed on the screen 117a' of the first computer 117a. By double clicking a first icon (not shown) an administrative user opens an Initialization Table within an initialization file 211a (preferably a Lotus Notes document stored within the database of the Report Engine 115 on the third computer 117c). The administrative user then enters initial information regarding the environment of the database system 113 as indicated by arrow 1. The initial information includes the names of the Lotus Notes databases 127a–b, the identification of the computer or "server" which stores the Lotus Notes databases 127a–b (the second and third computers 117b, 117c, respectively), and the data path between the first and second computers 117b, 117c and the communication network 133. The administrative user also enters a list of the field categories and field category options that are searchable, and the number of and a list of fields the Report Engine 115 will collect during searching each of the Lotus Notes databases 127a–b (e.g., the previously described retrieved field list). After the administrative user enters the initial information in the initialization file 211a, a general user with no specific knowledge of the database system 113's structure or content can generate reports. Typically this initial information is entered once and only is altered if the database system 113 changes.

A general user, working from the first computer 117a, opens the Report Engine 115 by double clicking an icon which the Lotus Notes application 129 displays on the first computer 117a's screen 117a'. The Report Engine 115 reads (indicated by arrow 2) the Initialization Table contained in the initialization file 211a and uses the initial information contained therein to display a Report Definition Form (listing searchable databases, field categories and field category options) on the first computer 117a's screen. Preferably the user may open a new Report Definition Form or a previously saved Report Definition Form (containing previously selected databases, field category options, and report formatting options). The user then selects from the Report Definition Form databases and field category options to search (arrow 3). The user also selects a Report Template and, if desired, may select other formatting options.

The Report Engine 115 generates a query string based on the user's selections, and, using the database location information in the initialization file 211a, instructs the Lotus Notes application 129 to execute a full text search on one of or both of the Lotus Notes databases 127a–b (arrows 4a and 4b, respectively), based on the query string. Documents 213a–b (within Lotus Notes databases 127a–b, respectively) containing the selected field category options are identified and the fields in the Initialization Table's retrieved field list are collected from each database as concatenated strings 213a'–b', respectively (arrows 5a and 5b). The Report Engine 115 stores the collected concatenated strings 213a'–b' (e.g., retrieved information lists 213a'–b') in a random-access data file 211b (arrow 6) on the hard disk of the first computer 117a. The retrieved information lists 213a'–b' also may be stored in a semicolon delimited text file (not shown) for viewing via a spread sheet if desired. Thereafter, the Report Engine 115 parses the desired information (e.g., the information to be displayed) from each retrieved information list 213a'–b'.

The Report Engine 115 operates significantly faster if the fields in the retrieved field list are transferred from each database as a single concatenated string rather than transferring only the desired field information on a field-by-field basis. This is true even though much of the retrieved field information may never be displayed (e.g., depending on the chosen Report Template). However, field-by-field transfer may be employed if desired.

To organize the retrieved information lists 213a'–b' within the random-access file 211b, the Report Engine 115 reads the user-selected Report Template (preferably stored with the Report Engine 115 on the third computer 117c). The Report Engine 115 determines an appropriate identifying key format for the retrieved information lists 213a'–b' by compiling a set of field categories within the selected Report Template. The Report Engine 115 then generates an identifying key (based on field categories within the selected Report Template and the corresponding field category values within the retrieved information list) for each retrieved information list in the random-access file 211b, as will be more fully understood with reference to the example of FIGS. 3A–E. The Report Engine 115 assigns each key a pointer which points to the retrieved information list (within the random-access file 211b) identified by the key, and the Report Engine 115 stores (arrow 7) the unsorted key/pointer list within an unsorted key array 211c.

The Report Engine 115 then sorts the keys within the unsorted key array 211c, either in a default order such as numerical and alphabetical, or, according to a user elected order. The sorted keys are stored in a sorted key array 211d (arrow 8). Preferably the sorted key array 211d replaces the sorted key array 211c. The unsorted and sorted key arrays 211c, 211d, respectively, are shown as separate arrays in FIG. 2 only to aid in the understanding of the Report Engine 115's operation. Thereafter during report generation, the Report Engine 115 obtains information from each retrieved information list from the random-access file 211b in the sequence of the ordered keys within the sorted key array 211d, and displays desired information on the first computer 117a's screen (arrow 9) according to the selected Report Template.

The operation of the inventive Report Engine 115 of FIG. 2 is further described with reference to the operational flow diagram of FIGS. 3A–E and the exemplary tables described below. The operational flow diagram of FIGS. 3A–E shows portions of FIG. 2 where appropriate to further facilitate understanding of the inventive Report Engine 115.

In the FIGS. 3A–E example, the first database 127a of FIG. 2 contains sales information for ABC Company for the months of January and February 1998, as shown in TABLE 1 below. The sales information within the first database 127a is organized by department within ABC Company and comprises the following field categories: department name, first-line manager name, second-line manager name, product name, product description, vendor name, sales for January 1998 and sales for February 1998, hereinafter referred to as dept, manager1, manager 2, product, proddesc, vendor, Jan. and Feb., respectively. The first database 127a is located on a first server (server 1) at Path=path1\database1.nsf.

TABLE 1

FIRST DATABASE 127a
Database *1: (Path = path1\database1.nsf)

| Dept | Manager1 | Manager2 | Product | Proddesc | Vendor | Jan | Feb |
|---|---|---|---|---|---|---|---|
| Video | Doe J | Smith S | Computer Monitor | SVGA Monitor | Monitor World | 5 | 10 |
| Keyboard | John D | Anderson C | Keyboard | Keyboard | Keyboard World | 6 | 8 |
| Peripherals | John D | Anderson C | Mouse | Mouse | Mouse World | 15 | 73 |
| Video | Doe J | Smith S | Laptop Monitor | SVGA Monitor | Monitor City | 6 | 68 |

The second database 127b of FIG. 2 also contains sales information for ABC Company, organized by department, as shown in TABLE 2 below. The second database 127b is located on a second server (server 2) at Path=path2\database2.nsf. In this example, the first and second databases 127a–b are homogeneous databases (e.g., both Lotus Notes databases). It will be understood, however, that heterogeneous databases may be employed.

TABLE 2

SECOND DATABASE 127b
Database #2: (Path = path2\database2.nsf)

| Dept | Manager1 | Manager2 | Product | Proddesc | Vendor | Jan | Feb |
|---|---|---|---|---|---|---|---|
| Motherboard | Stump P | Holton G | Motherboard | Motherboard | Board World | 6 | 9 |
| Video | Doe J | Smith S | Computer Monitor | SVGA Monitor | Monitor Country | 6 | 7 |
| Video | Doe J | Smith S | Screen Saver | Screen Saver | Monitor World | 3 | 4 |
| Video | Doe J | Smith S | Computer Monitor | SVGA Monitor | Monitor World | 6 | 3 |

Referring to the flow diagram of FIGS. 3A–E, to generate a report based on the information contained within the first and second databases 127a–b, the Report Engine 115 is executed in step 300 (e.g., by double-clicking a Report Engine icon while running the Lotus Notes application 129).

Thereafter, in step 301 the Report Engine 115 initializes its global variables (e.g., field categories and field category options to be displayed on the Report Definition Form of FIG. 4, described below), and establishes connections to the first and second databases 127a–b. Variable initialization and database connections are performed by reading an Initialization Table (shown below as TABLE 3) that contains Database Connection Information, General Definition Information and Other Related Information. The Initialization Table may be contained within an initialization file such as the initialization file 211a of FIG. 2.

TABLE 3

Initialization Table

Database Connection Information

| Database Name | Server Name | Database Path |
|---|---|---|
| Database 1 (database 127a) | Server 1 | path1\database1.nsf |
| Database 2 (database 127b) | Server 2 | path2\database2.nsf |

TABLE 3-continued

Initialization Table

General Definition Information

| Field Category Name | Field Category Name (on Report Definition Form) | Field Category Option Names |
|---|---|---|
| Department | Fdepartment | Video, Keyboard, Motherboard |
| Product | Fproduct | Computer Monitor, Laptop Monitor, Screen Saver |
| Vendor | FVendor | Monitor World, Monitor Country, Monitor City |

Other Related Information

| | |
|---|---|
| Fields to be retrieved during searching | 8, dept, manager1, manager2, product, proddesc, vendor, Jan, Feb, |

The Database Connection Information section of the Initialization Table comprises the name, server and path for both the first and second databases 127a–b. Database name, server and path information is supplied/maintained by an administrative user and is transparent to a general user of the Report Engine 115. A significant advantage of the Initialization Table is that a database may be added to or subtracted from the Report Engine 115's list of searchable databases merely by adding the database to or deleting the database from the Database Connection Information section of the Initialization Table; no additional Lotus Notes Script Code need be written.

The General Definition Information section of the Initialization Table comprises the name of each user-searchable field category (as previously provided by the administrative user), the corresponding field category name that appears on the Report Definition Form (FIG. 4) and a list of user-searchable field category options for each user-searchable field category. Accordingly, user-searchable field categories and user-searchable field category options may be added to or subtracted from the Report Engine 115's list of searchable field categories and searchable field category options merely by adding the field categories and field category options to or deleting the field categories and field category options from the Initialization Table; no additional Lotus Notes Script Code need be written. The Report Definition Form will be updated accordingly either automatically by the Report Engine or manually by the administrative user, depending on the particular implementation.

The Other Related Information section of the Initialization Table (TABLE 3) comprises a concatenated list of each field that is read from database documents during database searching (e.g., the retrieved field list), as described below. As previously stated, the present inventor has discovered that the Report Engine 115 operates much faster if all relevant information within a database document is transferred to the Report Engine 115 in a concatenated string rather than on a field-by-field basis.

Thereafter, the Report Engine parses the information to be displayed from the concatenated string. For instance, in the Other Related Information section of the Initialization Table (TABLE 3), next to the "Fields to be retrieved during searching" cell, is a cell containing a concatenated list "8, dept, manager1, manager2, product, proddesc, vendor, Jan., Feb.," that represents the fields of information retrieved (e.g., the retrieved field list) from database documents during searching, and thus lists all fields of information that may be displayed by a user. The "8" represents the number of fields of information in the list. Depending on the Report Template selected by the user, only a portion of the fields of information within the retrieved field list may be displayed. However, all these fields of information are retrieved by the Report Engine 115 for each document containing the field category options selected by the user. If an additional field of information is added to the first and/or second database 127a–b, the field of information can be rendered "displayable" by the Report Engine 115 by changing the number 8 to 9 and by adding an appropriate field name to the concatenated list within the Other Related Information section of the Initialization Table. No additional Lotus Notes Script Code is required.

Once the variable initialization and database connections are performed, control is passed to step 302. In step 302 a Report Definition Form 401 (shown in FIG. 4) is displayed on the user's computer screen. As described below, the Report Definition Form 401 is a graphical user interface that presents a user of the Report Engine 115 with selectable search criteria based on the contents of the Initialization Table (TABLE 3). The first portion of the Report Definition Form 401 comprises a list of user-selectable, source databases 403 that the user may search (e.g., a list of each database defined in the Initialization Table (TABLE 3)). In FIG. 4, the first database 127a and the second database 127b (the only databases defined in the Initialization Table— TABLE 3), are displayed on the Report Definition Form 401.

A Report Criteria Section 405 of the Report Definition Form 401 follows the list of source databases 403. The Report Criteria Section 405 comprises a list of searchable field categories 407a–c (e.g., "Department" 407a, "Vendor" 407b and "Product" 407c) and a list of one or more searchable field category options 409a–c, respectively, for each field category. The Report Criteria Section 405, for example, contains a list (complied from the Initialization Table— TABLE 3) of searchable departments 409a including each department within the first and second databases 127a–b (e.g., Keyboard, Motherboard and Video), a list of searchable vendors 409b (e.g., Monitor World, Monitor Country and Monitor City), and a list of searchable products 409c (e.g., Computer Monitor, Laptop Monitor and Screen Saver). Preferably only the vendors and products relevant to a selected department are displayed. A user thereafter may select from the field category option lists 409a–c the field category options (e.g., department options, vendor options and/or product options) to be searched by placing an "X" thereby (e.g., Department "Video", Vendor "Monitor World" and Products "Computer Monitor" and "Screen Saver" in FIG. 4). Field category options also may be explicitly excluded from a search via NOT logic (i.e., "NOT-selected") if desired by placing a "!" (not shown) adjacent a field category option.

Following the Report Criteria Section 405, a Report Format Section 411 specifies how and what information retrieved from the first and second databases 127a–b is displayed. The Report Format Section 411 comprises a list of one or more previously saved, selectable Report Templates 413, and beginning/ending dates 415 for the information displayed. Preferably the choices among Report Templates 413 and the beginning/ending dates 415 are displayed via pop-up dialog boxes. Each selectable Report Template is generated by an administrative user from a blank Report Template and describes how and what field categories are displayed on a Report Document as described with reference to FIG. 5.

FIG. 5 is a representative Report Template 501 for use with the Report Engine 115. In addition to a name block 503 (e.g., "Dept/Vend/Product") and a description block 505, the Report Template 501 comprises a Categories Section 507 and a Computable Section 509. Within the Categories Section 507, field category names (e.g., dept, manager1, vendor, product) are arranged on the line and in the order the field category names are to be displayed in a Report Document (FIG. 6). As shown in FIG. 5, the first line of a Report Document (FIG. 6) employing the Report Template 501 will display department and manager information, the second line of the Report Document will display vendor information and the third line of the Report Document will display product information.

Preferably the name of the Report Template 501 (e.g., Dept/Vend/Product) identifies the information that will be displayed by the template. For instance, if "Dept" is used as an acronym for [dept] [manager1], "Vend" is used as an acronym for [vendor], and "Product" is used as an acronym for [product], a user will know that a Report Template having the name "Dept/Vend/Product" will display department, first-line manager, vendor and product information. Similarly, a user will know that a Report Template having the name "Dept/Vend" will display department, first-line manager and vendor information only. Within the computable section 505, field category names (e.g., vendor and product or any other information a user wishes to display) are arranged next to database information on which computations (e.g., the total number of each product sold to a vendor in the months of January and February 1998) are to be performed.

In addition to the above-described Report Definition Form 401 entries, other advanced options preferably are provided that affect report format (e.g., rounding, field width, landscape/portrait display). These other options may be provided via pull-down menus or the like.

Once a user has selected the databases to search, the departments, vendors, and products for which to search, and the report format options from the Report Definition Form 401, the user "runs" the Report Definition Form 401 and control passes to step 303. Preferably the user also has the option to save the Report Definition Form 401, run the Report Definition Form 401 based on a sample of the information retrieved from the first database 127a and/or from the second database 127b, or may exit without running the Report Definition Form 401.

In step 303, the field category options selected from the Report Definition Form 401 are arranged to form a Lotus Notes full text search query string based on the following logic rules:

1. for each field category having user-selected field category options, OR each selected or NOT-selected field category option within the field category to form an ORed option set; and
2. AND each ORed option set.

Applying these logic rules to the user-selected field category options from the Report Definition Form 401 (FIG. 4), the resulting query string is:

query string=(Field dept="Video") AND (Field vendor= "Monitor World") AND (Field product="Computer Monitor" OR Field product="Screen Saver")

Thereafter, in step 304 the Report Engine 115 directs Lotus Notes to perform a full text search of the first and second databases 127a–b, based on the query string, and to identify the documents that meet the search criteria specified on the Report Definition Form 401 (FIG. 4).

In step 305, the Report Engine 115 retrieves the information listed in the retrieved field list of the Initialization Table (TABLE 3) for each identified document and stores the retrieved information (e.g., a retrieved information list) in a random-access file 211b (hereinafter "RAF 211b"). An additional file 211b' (FIG. 3C) may be generated which contains the number of documents identified by the search and the query string employed. TABLE 5 shows the contents of the RAF 211b when the first and second databases 127a–b are searched based on the above query string. Note the "RAF 211b list #" column is provided for reference purposes only and is not an actual column of information stored in the RAF 211b.

In step 306, global variables (e.g., conventional accumulator arrays) used during processing of the collected information are initialized.

In step 307, the Report Engine 115 processes the Report Template 501 selected by the user, identifying desired information to be displayed and computations to be performed. Based on the acronyms employed within the name block 503 of the Report Template 501 a key is generated for each retrieved information list within the RAF 211b. For instance, the Report Template 501's name comprises acronyms Dept, Vend, and Product which represent [dept] [manager1], [vendor] and [product], respectively. The key for each retrieved information list within the RAF 211b, therefore, is a concatenated string containing the list's field category values for "dept manager1 vendor product." It will be understood that any suitable key for identifying each retrieved information list may be similarly employed.

In step 308, an unsorted index table shown below as TABLE 5 is generated which lists the key for each retrieved information list in the RAF 211b and which includes a pointer for mapping each key to the corresponding retrieved information list from which the key originated. The unsorted index table is stored in the unsorted key array 211c as previously described. The order of the keys in the unsorted index table is the same order as the order of the retrieved information lists in the RAF 211b.

TABLE 5

Unsorted Index

| Dept. Manager1 Vendor Product | corresponding RAF 211b retrieved information list # |
|---|---|
| Video Doe J MonitorWorld Computer Monitor | 1 |
| Video Doe J MonitorWorld Screen Saver | 2 |
| Video Doe J MonitorWorld Computer Monitor | 3 |

In step 309, the unsorted index table is sorted using a conventional MergeSort algorithm so as to generate a sorted (e.g., in alphabetical or user-specified order) index table as shown in TABLE 6. The sorted index table is stored in the sorted key array 211d. Because the key index tables (TABLES 5 and 6) contain only a few fields of information the unsorted key index table may be sorted much faster than the RAF 211b which may contain retrieved information lists having hundreds of fields. As described below, the sorted key index table (TABLE 6) is used to organize the display of information from the retrieved information lists in the RAF 211b as the information is displayed on a Report Document.

TABLE 4

RAF 211b Results:

| RAF 211b list # | Dept | Manager1 | Manager2 | Product | Prod-desc | Vendor | Jan | Feb |
|---|---|---|---|---|---|---|---|---|
| 1 | Video | Doe J | Smith S | Computer Monitor | SVGA Monitor | Monitor World | 5 | 10 |
| 2 | Video | Doe J | Smith S | Screen Saver | Screen Saver | Monitor World | 3 | 4 |
| 3 | Video | Doe J | Smith S | Computer Monitor | SVGA Monitor | Monitor World | 6 | 3 |

TABLE 6

Sorted Index

| Dept. Manager1 Vendor Product | corresponding RAF 211b retrieved information list |
|---|---|
| Video Doe J MonitorWorld Computer Monitor | 1 |
| Video Doe J MonitorWorld Computer Monitor | 3 |
| Video Doe J MonitorWorld Screen Saver | 2 |

To aid in computation of the computable data within a Report Document (e.g., total sales per month per department, per vendor or per product), in step 310 a data range table (TABLE 7) is computed from the sorted index table (TABLE 6). A "data range" is the number of retrieved information lists (in RAF 211b) having the same field category value (e.g., video) for the same field category (e.g., department). Accordingly, the data range is "three" for the "department" field category (e.g., retrieved information lists 1–3 have the same department field value—"video"), is three for the "vendor" field category (e.g., retrieved information lists 1–3 have the same vendor field value—"monitor world"), and is two for the "product" field category (e.g., retrieved information lists 1–2 have the same product field value—"computer monitor").

TABLE 7

Data Ranges

| Dept | Vend | Product |
|---|---|---|
| 3 | 3 | 2 |
| 0 | 0 | 0 |
| 0 | 0 | 3 |

In step 311, the Report Engine 115 employs the Report Template 501 (FIG. 5), the RAF 211b, the sorted index table (TABLE 6) and the data range table (TABLE 7) to generate/display a Report Document 601 as shown in FIG. 6. The Report Document 601 (FIG. 6) comprises a General Information Section 603 and a Report Information Section 605. The General Information Section 603 may contain any or no information, and preferably comprises such information as the company name (e.g., ABC Company), the name of the Report Template 501 used (e.g., Dept/Vend/Product), the dates covered by the data within the Report Document 601 (e.g., Jan./98 to Feb./98), the name of the person generating the Report Document 601 (e.g., John Doe) and a description of the Report Document 601.

The Report Information Section 605 comprises search information 607 read from the file 211b' such as the number of documents identified and the query string used during searching, and also comprises report data 609 derived from the RAF 211b, displayed in the order specified by the sorted index table (TABLE 6) and arranged as specified by the Report Template 501. For instance, line 609a of the report data 609 is organized as specified by the first-line of the Report Template 501 (e.g., department and first line manager information on the same line). Similarly, the second line 609b is organized as specified by the second line of the Report Template 501 (e.g., vendor information), and the third and fourth lines 609c, 609d are organized as specified by the third line of the Report Template 501 (e.g., product information).

Also shown on the Report Document 601 are the total sales per month on a per vendor basis and on a per product basis. To compute these values, the data range table (TABLE 7) is employed. For example, to compute the total sales to the vendor "Monitor World" for January 1998 the following steps are performed:

1. the "Vend" column of the data range table (TABLE 7) is consulted;
2. because the data range is three, the field values for January (e.g., Jan.) for all three retrieved information lists within the RAF 211b are obtained; and
3. the three field values are added (e.g., via a conventional accumulator array) and the total is displayed.

The data range table (TABLE 7) thus informs the Report Engine 115 which retrieved information lists must be read for each computation. Similar operations are performed for each entry in the Jan. and Feb. columns of the report data section 609 of FIG. 6.

After the Report Document 601 is displayed, in step 312 the Report Engine 115's operation terminates.

Accordingly, a user of the Report Engine 115 can generate a customizable (e.g., via Report Templates and other options that affect report format) Report Document 601 (FIG. 6) based on a variety of search criteria (e.g., selected via the Report Definition Form 401 of FIG. 4) for any Lotus Notes database system. The user generates custom reports without knowledge of the structure of any database within the database system, without manually generating a single query string and without knowing Lotus Notes Script Code. The inventive Report Engine adapts easily to a user's specific database environment, dynamically incorporating changes made to the Initialization Table and to the Report Templates.

The foregoing description discloses only the preferred embodiments of the invention, modifications of the above disclosed apparatus and method which fall within the scope of the invention will be readily apparent to those of ordinary skill in the art. For instance, any of the database names, field categories, field category options or Report Template names may be hard coded on the Report Definition Form 401 rather than employing an Initialization Table. Additionally, Report Definition Form selections may be stored and employed as the default selections on subsequent Report Definition Forms to expedite multiple searches involving few changes in user selections between searches.

If desired, a password may be required for a user to access database information. If the Report Definition Form is configured so that a user types information (e.g., rather than checking a box), a validation procedure may be employed wherein the Report Engine verifies the typed information and obtains supporting information about the typed information (e.g., the structure of a department, which products are produced by the department, who works in the department, etc.) so as to affect the field category options displayed on the Report Definition Form. As used herein, a computer program product's "carrier" includes any medium for storage or retrieval such as a floppy disc, a compact disc, a digital versatile disc, a World Wide Web server or a hyperlink, and the like. Further, the Report Engine can operate with any database that can be searched by Lotus Notes (whether Lotus Notes based or not). Additionally, multiple blank Report Templates having various data formatting options (e.g., different arrangement or computation options) may be provided.

Accordingly, while the present invention has been disclosed in connection with the preferred embodiments thereof, it should be understood that other embodiments may fall within the spirit and scope of the invention, as defined by the following claims.

The invention claimed is:

1. A computer-based method of enabling a user to generate, via Lotus Notes, a report from data contained in one or more databases stored on one or more computers, comprising:

providing computer program code capable of executing a Lotus Notes search of a plurality of user-selected searchable databases based on a single Lotus Notes query string;

executing a Lotus Notes search of one or more user-selected searchable databases, to identify one or more documents containing user-selected searchable field names;

collecting information from the one or more identified documents;

organizing at least a portion of the collected information; and outputting at least a portion of the organized information as a report.

2. The computer-based method of claim 1 further comprising:

displaying searchable database names and searchable field names on a computer screen;

receiving a user-selection from among the searchable database names and the searchable field names; and generating a Lotus Notes query string based on the user-selected searchable field names.

3. The computer-based method of claim 2 wherein displaying searchable database names and searchable field names on a computer screen comprises displaying a graphical user interface.

4. The computer-based method of claim 2 wherein displaying searchable database names and searchable field names on a computer screen comprises displaying searchable database names and searchable field names stored in an initialization file saved in a computer-accessible memory, the initialization file comprising a list of searchable fields, a list of searchable databases, and a path to each searchable database.

5. The computer-based method of claim 2 wherein displaying searchable database names and searchable field names on a computer screen further comprises displaying searchable field categories and searchable field category options within each searchable field category, and wherein generating a query string based on the user-selected searchable field names comprises generating a full text query string by:

for each field category having user-selected field category options, ORing each selected or NOT-selected field category option within the field category to form an ORed option set for the field category; and ANDing each ORed option set.

6. The computer-based method of claim 2 wherein executing a Lotus Notes search of one or more user-selected searchable databases comprises instructing Lotus Notes to execute a full text search using the generated query string.

7. The computer-based method of claim 2 wherein displaying searchable database names and searchable field names further comprises displaying searchable field categories and searchable field category options for each searchable field category, and further comprises:

computing a data range for each field category to be displayed;

wherein outputting the organized information further comprises outputting data computed by employing the data ranges.

8. The computer-based method of claim 1 wherein collecting information from the identified documents comprises saving the information in a random-access file in a computer-accessible memory.

9. The computer-based method of claim 1 wherein outputting the organized information as a report comprises outputting the organized information according to a user-selected report format option.

10. The computer-based method of claim 9 further comprising:

providing a user with a blank report template in which the user specifies fields to include in a report and how each field is arranged within the report;

completing the report template by storing within the blank report template user-specified fields to include in a report and a user-specified arrangement for the fields within the report; and saving the completed report template as a saved report template.

11. The computer-based method of claim 10 further comprising:

displaying an identifier for each saved report template; and receiving user selection among the saved report template identifiers; and wherein outputting the organized information as a report comprises displaying the organized information according to the selected report template.

12. The computer-based method of claim 11 wherein displaying an identifier for each saved report template comprises displaying a graphical user interface.

13. The computer-based method of claim 1 wherein collecting information from the identified documents comprises collecting a retrieved information list comprising a user-specified list of fields of information to retrieve from each identified document, and wherein organizing the collected information comprises:

assigning each retrieved information list an identifying key;

assigning each key a pointer pointing to the retrieved information list identified by the key; and sorting the keys; and wherein outputting the organized information as a report further comprises retrieving, via the key pointers, the fields of information from each retrieved information list to include in the report, so as to display, based on the order of the sorted keys, the fields of information from each retrieved information list.

14. The computer-based method of claim 13 further comprising displaying a list of selectable report templates, each selectable report template having a name formed from a combination of a plurality of pre-defined acronyms, and wherein assigning each retrieved information list an identifying key comprises assigning each retrieved information list an identifying key based on the report template's name.

15. A computer program product for generating reports via a Lotus Notes application being executed on a data processing system, the computer program product comprising:

a recording medium readable by a computer, the recording medium storing instructions executable by a computer executing a Lotus Notes application;

the computer executable instructions comprising:

means for directing a computer to search a user-selected database to identify documents containing one or more user-selected fields, the means capable of executing a Lotus Notes search of a plurality of user-selected databases based on a single Lotus Notes query string;

means for directing the computer to collect information from the identified documents;

means for directing the computer to organize at least a portion of the collected information; and means for directing the computer to output at least a portion of the organized information as a report.

16. The computer program product of claim 15 wherein the computer executable instructions further comprise:

means for directing the computer to store user-provided database name and location information;

means for directing the computer to store user-provided searchable fields for the named databases;

means for directing the computer to display the user-provided database names and the user-provided searchable fields;

means for directing the computer to receive user selection among the displayed database names and the displayed searchable fields; and means for directing the computer to generate a query string based on the user-selected searchable fields.

17. The computer program product of claim 16 wherein the means for directing the computer to store user-provided database name information and the means for directing the computer to store user-provided searchable fields comprises a lookup table.

18. The computer program product of claim 16 wherein the means for directing the computer to display user-provided database names and user-provided searchable fields comprises a graphical user interface.

19. The computer program product of claim 16 wherein the means for directing the computer to store user-provided searchable fields further comprises means for storing user-provided searchable field categories and user-provided searchable field category options within each user-provided searchable field category, and wherein the means for directing the computer to generate a query string comprises program code for generating a full text search by, for each field category having a user-selected field category option, ORing each selected or NOT-selected field category option within the field category so as to form an ORed option set for the field category, and ANDing each ORed option set.

20. The computer program product of claim 16 wherein the means for directing the computer to search a user-selected database comprises program code for instructing Lotus notes to execute a full text search using the generated query string.

21. The computer program product of claim 15 wherein the means for directing the computer to collect information from the identified documents comprises program code for saving the information in a random-access file in a memory.

22. The computer program product of claim 15 wherein the computer executable instructions further comprise:

means for directing the computer to store a report template comprising a user-provided list of fields to include in a report;

means for directing the computer to store an identifier for each report template;

means for directing the computer to display the identifier for each report template; and means for directing the computer to receive user selection among the displayed report template identifiers; and wherein the means for directing the computer to display the organized information as a report comprises means for directing the computer to display the organized information according to the report template identified by the user-selected report template identifier.

23. The computer program product of claim 15 wherein means for directing the computer to collect information from the identified documents comprises means for collecting a user-provided retrieved information list comprising a user-provided list of fields to retrieve from each identified document, and wherein means for directing the computer to organize the collected information comprises:

means for directing the computer to assign each retrieved information list an identifying key;

means for directing the computer to assign each key a pointer pointing to the retrieved information list identified by the key; and means for directing the computer to sort the keys; and wherein the means for directing the computer to display the organized information as a report comprises means for directing the computer to retrieve, via the key pointers, information to be displayed, and to display the retrieved information based on the order of the sorted keys.

24. The computer program product of claim 15 wherein the computer executable instructions further comprise:

means for directing the computer to provide a user with a blank report template which the user completes by specifying fields to include in a report and how each field is arranged within the report;

means for directing a computer to save a completed report template as a saved report template having an identifier;

means for directing the computer to display the identifier for each saved report template; and means for directing the computer to receive user-selection among the displayed report template identifiers, and wherein means for directing the computer to organize the collected information comprises:

means for directing the computer to assign information collected from each document an identifying key;

means for directing the computer to assign each key a pointer pointing to the information identified by the key; and means for directing the computer to sort the keys; and wherein means for directing the computer to display the organized information as a report comprises retrieving, via the key pointers, only the fields specified in the user-selected report template and displaying the retrieved fields in the order of the sorted keys and with the arrangement of the user-selected report template.

25. A computer-based method of enabling a user to generate, via Lotus Notes, a report from data contained in one or more databases stored on one or more computers, comprising:

displaying on a computer screen searchable database names and searchable field names stored in an initialization file saved in a computer-accessible memory, the initialization file comprising a list of searchable fields, a list of searchable databases, and a path to each searchable database;

receiving a user-selection from among the searchable database names and the searchable field names;

generating a Lotus Notes query string based on the user-selected searchable field names;

executing a Lotus Notes search of one or more user-selected searchable databases, to identify one or more documents containing user-selected searchable field names;

collecting information from the one or more identified documents;

organizing at least a portion of the collected information; and outputting at least a portion of the organized information as a report.

26. A computer-based method of enabling a user to generate, via Lotus Notes, a report from data contained in one or more databases stored on one or more computers, comprising:

displaying searchable database names and searchable field names on a computer screen including displaying searchable field categories and searchable field category options within each searchable field category;

receiving a user-selection from among the searchable database names and the searchable field names;

generating a Lotus Notes query string based on the user-selected searchable field names including generating a full text query string by:

for each field category having user-selected field category options, ORing each selected or NOT-selected field category option within the field category to form an ORed option set for the field category; and ANDing each ORed option set;

executing a Lotus Notes search of one or more user-selected searchable databases, to identify one or more documents containing user-selected searchable field names;

collecting information from the one or more identified documents;

organizing at least a portion of the collected information; and outputting at least a portion of the organized information as a report.

27. A computer-based method of enabling a user to generate, via Lotus Notes, a report from data contained in one or more databases stored on one or more computers, comprising:

displaying searchable database names and searchable field names on a computer screen including displaying searchable field categories and searchable field category options for each searchable field category, and computing a data range for each field category to be displayed;

receiving a user-selection from among the searchable database names and the searchable field names;

generating a Lotus Notes query string based on the user-selected searchable field names;

executing a Lotus Notes search of one or more user-selected searchable databases, to identify one or more documents containing user-selected searchable field names;

collecting information from the one or more identified documents;

organizing at least a portion of the collected information; and outputting at least a portion of the organized information as a report including outputting data computed by employing the data ranges.

28. A computer-based method of enabling a user to generate, via Lotus Notes, a report from data contained in one or more databases stored on one or more computers, comprising:

providing a user with a blank report template in which the user specifies fields to include in a report and how each field is arranged within the report;

completing the report template by storing within the blank report template user-specified fields to include in a report and a user-specified arrangement for the fields within the report;

saving the completed report template as a saved report template;

executing a Lotus Notes search of one or more user-selected searchable databases, to identify one or more documents containing user-selected searchable field names;

collecting information from the one or more identified documents;

organizing at least a portion of the collected information; and outputting at least a portion of the organized information as a report according to a user-selected report format option.

29. The computer-based method of claim 28 further comprising:

displaying an identifier for each saved report template; and receiving user selection among the saved report template identifiers; and wherein outputting the organized information as a report comprises displaying the organized information according to the selected report template.

30. The computer-based method of claim 29 wherein displaying an identifier for each saved report template comprises displaying a graphical user interface.

31. A computer-based method of enabling a user to generate, via Lotus Notes, a report from data contained in one or more databases stored on one or more computers, comprising:

executing a Lotus Notes search of one or more user-selected searchable databases, to identify one or more documents containing user-selected searchable field names;

collecting information from the one or more identified documents by collecting a retrieved information list comprising a user-specified list of fields of information to retrieve from each identified document;

organizing at least a portion of the collected information by:

assigning each retrieved information list an identifying key;

assigning each key a pointer pointing to the retrieved information list identified by the key; and sorting the keys; and outputting at least a portion of the organized information as a report by retrieving, via the key pointers, the fields of information from each retrieved information list to include in the report, so as to display, based on the order of the sorted keys, the fields of information from each retrieved information list.

32. The computer-based method of claim 31 further comprising displaying a list of selectable report templates, each selectable report template having a name formed from a combination of a plurality of pre-defined acronyms, and wherein assigning each retrieved information list an identifying key comprises assigning each retrieved information list an identifying key based on the report template's name.

33. A computer program product for generating reports via a Lotus Notes application being executed on a data processing system, the computer program product comprising:

a recording medium readable by a computer, the recording medium storing instructions executable by a computer executing a Lotus Notes application;

the computer executable instructions comprising:

means for directing the computer to store user-provided database name and location information;

means for directing the computer to store user-provided searchable fields for the named databases;

means for directing the computer to display the user-provided database names and the user-provided searchable fields;

means for directing the computer to receive user selection among the displayed database names and the displayed searchable fields;

means for directing the computer to generate a query string based on the user-selected searchable fields;

means for directing a computer to search a user-selected database to identify documents containing one or more user-selected fields;

means for directing the computer to collect information from the identified documents;

means for directing the computer to organize at least a portion of the collected information; and means for directing the computer to output at least a portion of the organized information as a report.

34. The computer program product of claim 33 wherein the means for directing the computer to store user-provided database name information and the means for directing the computer to store user-provided searchable fields comprises a lookup table.

35. The computer program product of claim 33 wherein the means for directing the computer to display user-provided database names and user-provided searchable fields comprises a graphical user interface.

36. The computer program product of claim 33 wherein the means for directing the computer to store user-provided searchable fields further comprises means for storing user-provided searchable field categories and user-provided searchable field category options within each user-provided searchable field category, and wherein the means for directing the computer to generate a query string comprises program code for generating a full text search by, for each field category having a user-selected field category option, ORing each selected or NOT-selected field category option within the field category so as to form an ORed option set for the field category, and ANDing each ORed option set.

37. The computer program product of claim 33 wherein the means for directing the computer to search a user-selected database comprises program code for instructing Lotus notes to execute a full text search using the generated query string.

38. A computer program product for generating reports via a Lotus Notes application being executed on a data processing system, the computer program product comprising:

a recording medium readable by a computer, the recording medium storing instructions executable by a computer executing a Lotus Notes application;

the computer executable instructions comprising:

means for directing the computer to store a report template comprising a user-provided list of fields to include in a report;

means for directing the computer to store an identifier for each report template;

means for directing the computer to display the identifier for each report template;

means for directing the computer to receive user selection among the displayed report template identifiers;

means for directing a computer to search a user-selected database to identify documents containing one or more user-selected fields;

means for directing the computer to collect information from the identified documents;

means for directing the computer to organize at least a portion of the collected information; and means for directing the computer to output at least a portion of the organized information as a report by displaying the organized information according to the report template identified by the user-selected report template identifier.

39. A computer program product for generating reports via a Lotus Notes application being executed on a data processing system, the computer program product comprising:

a recording medium readable by a computer, the recording medium storing instructions executable by a computer executing a Lotus Notes application;

the computer executable instructions comprising:

means for directing a computer to search a user-selected database to identify documents containing one or more user-selected fields;

means for directing the computer to collect information from the identified documents by collecting a user-provided retrieved information list comprising a user-provided list of fields to retrieve from each identified document;

means for directing the computer to organize at least a portion of the collected information by:

assigning each retrieved information list an identifying key;

assigning each key a pointer pointing to the retrieved information list identified by the key; and sorting the keys; and means for directing the computer to output at least a portion of the organized information as a report by retrieving, via the key pointers, information to be displayed, and displaying the retrieved information based on the order of the sorted keys.

40. A computer program product for generating reports via a Lotus Notes application being executed on a data processing system, the computer program product comprising:

a recording medium readable by a computer, the recording medium storing instructions executable by a computer executing a Lotus Notes application;

the computer executable instructions comprising:

means for directing the computer to provide a user with a blank report template which the user completes by specifying fields to include in a report and how each field is arranged within the report;

means for directing a computer to save a completed report template as a saved report template having an identifier;

means for directing the computer to display the identifier for each saved report template;

means for directing the computer to receive user-selection among the displayed report template identifiers;

means for directing a computer to search a user-selected database to identify documents containing one or more user-selected fields;

means for directing the computer to collect information from the identified documents;

means for directing the computer to organize at least a portion of the collected information by:

assigning information collected from each document an identifying key;

assigning each key a pointer pointing to the information identified by the key; and sorting the keys; and means for directing the computer to output at least a portion of the organized information as a report by retrieving, via the key pointers, only the fields specified in the user-selected report template and displaying the retrieved fields in the order of the sorted keys and with the arrangement of the user-selected report template.

41. A computer-based method of enabling a user to generate, via Lotus Notes, a report from data contained in one or more databases stored on one or more computers, comprising:

executing a Lotus Notes search of one or more user-selected searchable databases, to identify one or more documents containing user-selected searchable field names;

collecting information from the one or more identified documents by saving the information in a random-access file in a computer-accessible memory;

organizing at least a portion of the collected information; and outputting at least a portion of the organized information as a report.

42. A computer-based method of enabling a user to generate, via Lotus Notes, a report from data contained in one or more databases stored on one or more computers, comprising:

executing a Lotus Notes search of one or more user-selected searchable databases, to identify one or more documents containing user-selected searchable field names;

collecting information from the one or more identified documents;

organizing at least a portion of the collected information; and outputting at least a portion of the organized information as a report according to a user-selected report format option.

* * * * *